(12) United States Patent
Makino et al.

(10) Patent No.: US 7,635,933 B2
(45) Date of Patent: Dec. 22, 2009

(54) RESOLVER, METHOD FOR MANUFACTURING RESOLVER, AND DEVICE FOR MOUNTING CONDUCTIVE WIRE TO RESOLVER

(75) Inventors: Yusuke Makino, Kyoto (JP); Keita Nakanishi, Kyoto (JP)

(73) Assignee: Nidec Corporation, Kyoto (JP)

( * ) Notice: Subject to any disclaimer, the term of this patent is extended or adjusted under 35 U.S.C. 154(b) by 78 days.

(21) Appl. No.: 11/812,421

(22) Filed: Jun. 19, 2007

(65) Prior Publication Data

US 2008/0122304 A1      May 29, 2008

(30) Foreign Application Priority Data

Jun. 21, 2006 (JP) .............................. 2006-171228

(51) Int. Cl.
   *H02K 11/00* (2006.01)
(52) U.S. Cl. ........................... 310/71; 310/68 B
(58) Field of Classification Search ............... 310/68 B, 310/71, 89, 179; 324/200
   See application file for complete search history.

(56) References Cited

U.S. PATENT DOCUMENTS

| | | | | |
|---|---|---|---|---|
| 5,920,135 A | * | 7/1999 | Ohshita ........................ | 310/71 |
| 6,936,942 B1 | * | 8/2005 | Okazaki et al. ................ | 310/71 |
| 7,159,296 B2 | * | 1/2007 | Miya et al. .................... | 29/598 |
| 7,309,936 B2 | * | 12/2007 | Utsumi et al. ................. | 310/71 |

FOREIGN PATENT DOCUMENTS

| | | |
|---|---|---|
| JP | 3299702 B2 | 7/2002 |
| JP | 2004-40843 A | 2/2004 |
| JP | 2004-64821 A | 2/2004 |
| JP | 3588455 B2 | 11/2004 |

* cited by examiner

*Primary Examiner*—Michael C Zarroli
(74) *Attorney, Agent, or Firm*—Westerman, Hattori, Daniels & Adrian, LLP

(57) ABSTRACT

After a winding machine connects a winding wire to a terminal pin, a slackening member is moved in a substantially horizontal direction substantially orthogonal to a direction of a terminal block being extended so as to be located on an orbit of the winding wire. Then, a led part of the winding wire radially between the terminal pin and teeth is extended to the teeth while in contact with a curved surface of a tip of the slackening member. That is, the led part is extended while bent in the substantially horizontal direction. After the winding wire is wound around the respective teeth, the slackening member is moved out of the orbit.

10 Claims, 11 Drawing Sheets

RESOLVER, METHOD FOR MANUFACTURING RESOLVER, AND DEVICE FOR MOUNTING CONDUCTIVE WIRE TO RESOLVER

BACKGROUND OF THE INVENTION

1. Technical Fields

The present invention relates to a technique for mounting a conductive wire to teeth of a resolver.

2. Background of the Related Art

A resolver is used for high-accuracy detection of a rotational position of a rotor magnet in a brushless motor. The resolver includes a resolver stator having a plurality of teeth formed on an inner circumference thereof, and a resolver rotor rotatably arranged in the resolver stator. The resolver rotor is mounted coaxially with the rotor magnet in the brushless motor so as to rotate integrally with the rotor magnet.

A conductive wire is wound around each of the teeth of the resolver stator to form an excitation winding or an output winding. Variation in voltage output from the output winding is detected in accordance with variation in radial distance between an inner circumferential face of the teeth of the resolver stator and an outer circumferential face of the resolver rotor, thereby the rotational position of the rotor magnet in the brushless motor is detected.

The excitation winding or the output winding formed around each of the teeth is connected to a plurality of terminal pins provided on a terminal block attached radially outward from the teeth of the resolver stator. The terminal block is generally made of a resin member. Therefore, it is required to consider that the terminal block is expandable when heat is applied thereto. That is, in a case where the conductive wire has no slack in a portion connecting the teeth and the terminal pin, the conductive wire in the portion connecting the teeth and the terminal pin may be excessively strained due to thermal expansion of the terminal block. As a result, the conductive wire in the portion connecting the teeth and the terminal pin is possibly cut off.

In a case where the brushless motor is used in an environment (e.g., in an automobile) easily affected by heat thermal expansion of a member thereof needs to be taken into consideration.

Therefore, arrangements are conventionally made such as providing sufficient slack to the conductive wire in the portion connecting the teeth and the terminal pin.

According to a first structure of a conventional resolver, a longitudinal bar member is arranged between the teeth and the terminal pin when a winding machine connects the teeth and the terminal pin with the conductive wire. The conductive wire is connected to the terminal pin while in contact with a top face of the longitudinal bar member which is removed in a direction substantially perpendicular to a direction of the conductive wire crossing the longitudinal bar member after the conductive wire is connected. Accordingly, the conductive wire thus connected is provided with slack.

According to a second structure of the conventional resolver, the terminal block is provided with a through-hole so that a plate shaped fitting is inserted between the teeth and the terminal pin from a back of the terminal block. In such a structure, the conductive wire is connected to the terminal pin while in contact with a top face of the fitting projecting upward from a top face of the terminal block. The fitting is taken downward out of the terminal block after the conductive wire is connected to the terminal pin. Accordingly, the conductive wire thus connected is provided with slack.

According to a third structure of the conventional resolver, there are arranged between the teeth and the terminal pin a plurality of slackening pins for slackening the conductive wire. The slackening pins are respectively inserted into a plurality of holes provided in the terminal block from the back of the terminal block to be arranged so as to project from the top face of the terminal block in a substantially vertical direction thereto. The conductive wire is connected to the terminal pin while in contact with a side face of the slackening pin. After the conductive wire is connected, the slackening pin is taken downward out of the terminal block. Accordingly, the conductive wire thus connected is provided with slack.

As described above, various arrangements have been made to provide slack to the conductive wire between the teeth and the terminal pin in the resolver. However, in the first conventional structure, there is a problem that the conductive wire is damaged as the longitudinal bar member is laterally pulled out while the conductive wire contacts the top face of the longitudinal bar member. In the second conventional structure, it is required to provide the terminal block with a large space for inserting the fitting, resulting in deteriorated intensity of the terminal block. Further, in the first and second conventional structures, since the conductive wire is pushed upward to have slack, there is another problem that the conductive wire is difficult to be wound around the respective teeth with the winding machine due to force of pulling the conductive wire upward.

In the third conventional structure, the slackening pins are taken out downward while in contact with the conductive wire, causing the problem that the conductive wire is damaged.

BRIEF SUMMARY OF THE INVENTION

The resolver of the invention has: a rotor core having an outer circumferential face in a noncircular shape for rotating around a predetermined central axis; a plurality of teeth having an axis core identical to that of the central axis and extending toward the central axis to be arranged circumferentially spaced apart from one another; a coil formed by winding a conductive wire for a plurality of times around each of the plurality of teeth; a terminal block extending radially outward from the plurality of teeth and having a plurality of terminal pins respectively connected with a lead part of the coil; and a concave part. The concave part is formed radially inside the plurality of terminal pins on the terminal block. The concave part extends in a substantially horizontal direction substantially orthogonal to a direction of the terminal block being extended. The lead part of the coil is across the concave part.

In an embodiment, the lead part radially between the teeth and the terminal pin includes a slack part. In another embodiment of the invention, is a plurality of regulatory pins for hanging thereon the respective lead part are formed radially between the concave part and the teeth on the terminal block. The regulatory pins axially extend from a top face of the terminal block.

In an embodiment, the plurality of terminal pins are aligned substantially perpendicular to the direction of the terminal block being extended, and the plurality of regulatory pins are aligned substantially in parallel with the plurality of terminal pins.

In an embodiment of the invention, the plurality of terminal pins and the plurality of regulatory pins are identical in number.

In an embodiment of the invention, the plurality of terminal pins are aligned substantially perpendicular to the direction of the terminal block being extended. In the embodiment, a width of the concave part in a direction substantially perpendicular to the direction of the terminal block being extended is larger than a distance between the terminal pins on both ends in a direction of the plurality of terminal pins substantially perpendicular to the direction of the terminal block being extended.

In an embodiment of the invention, a plurality of regulatory pins for hanging thereon the respective lead part are formed radially between the concave part and the teeth on the terminal block, the regulatory pins axially extending from a top face of the terminal block, and the slack part is formed radially between the regulatory pin and the terminal pin.

In an embodiment of the invention, a slackening member is inserted into the concave part, and the slackening member for sliding along the concave part contacts the lead part to form the slack part.

There is also provide a motor mounting the resolver of the invention. The motor includes: a shaft arranged coaxially with the central axis; a rotor magnet for rotating integrally with the shaft; a stator having an axis core identical to that of the central axis and radially facing the rotor magnet; a housing having a cylindrical part for fixing the stator and a bottom part for blocking an end of the cylindrical part; and a bracket for blocking another end of the cylindrical part. The rotor core is fixed to the shaft, and the teeth are indirectly fixed to the bracket. In an embodiment, the motor further includes a bus bar. The bus bar is provided at one end of the stator. The bus bar includes a plurality of power distribution plates to be electrically connected with the stator and a power distribution plate retentive part having a through-hole along the central axis, for retaining the plurality of power distribution plates. The resolver is arranged in the through-hole of the bus bar. The power distribution plate retentive part and the resolver are radially overlaid with each other.

In an embodiment of the motor, the power distribution plate retentive part has a substantially circular arc shape. The terminal block is arranged at a cutout part not formed with the power distribution plate retentive part. The terminal block projects radially outward from an inner circumferential face of the through-hole.

According to the present invention, a resolver includes a plurality of teeth extending toward a predetermined central axis and circumferentially spaced apart from one another, a coil formed by winding a conductive wire for a plurality of times around the plurality of teeth, and a terminal block extending radially outward from the plurality of teeth and having a plurality of terminal pins for respectively connecting a lead part of the coil. On the terminal block, there is formed a concave part radially inside the plurality of terminal pins, the concave part extending in a substantially horizontal direction substantially orthogonal to a direction of the terminal block being extended.

In the concave part, a slackening member is movably arranged along the substantially horizontal direction. A tip of the slackening member is arranged on an orbit of the lead part of the coil connecting the terminal pin and the teeth, so that the lead part is bent to be provided with slack. According to such a structure, even when the terminal block is thermally expanded due to influence by heat, that is, a radial distance between the terminal pin and the teeth is enlarged, it is possible to prevent the conductive wire from being cut off as the slack is provided to the lead part.

DETAILED DESCRIPTION OF THE INVENTION

<Structure of Brushless Motor>

Figure 1:
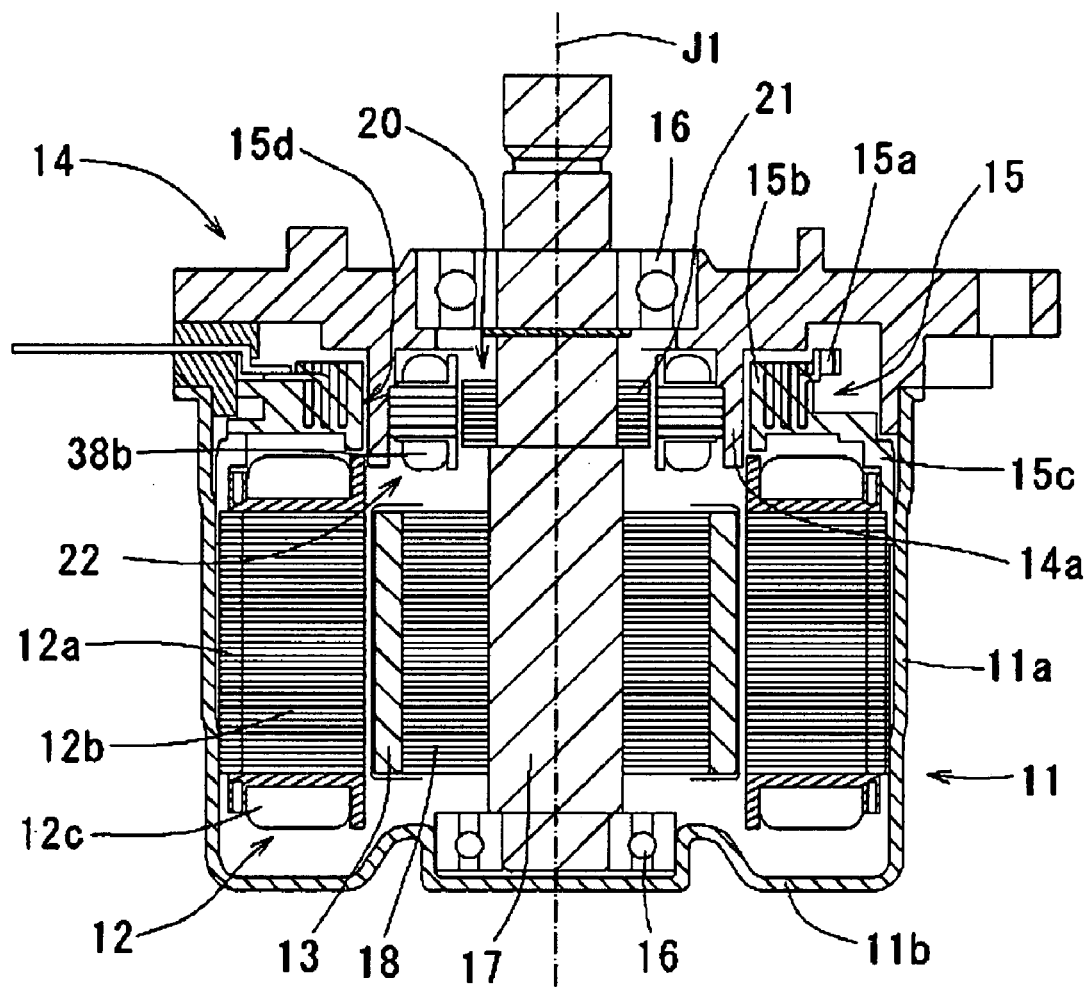
FIG. 1 is a schematic cross-sectional view, along an axial direction, of a brushless motor according to a first preferred embodiment of the present invention.

A general structure of a brushless motor 10 according to the present invention is described with reference to FIG. 1. FIG. 1 is a cross-sectional pattern view, along an axial direction, of the general structure of the brushless motor 10 according to the present invention. Hereinafter, in FIG. 1, a side of a bottom part 11b is designated as an axially lower side, and a side of a bracket 14 is designated as an axially upper side, while these axially upper side and axially lower side do not necessarily coincide with a direction of gravitational force.

With reference to FIG. 1, the brushless motor 10 includes a stator 12 and a rotor magnet 13 accommodated in a housing 11 having a cylindrical part 11a formed around a predetermined central axis J1 and a bottom part 11b closing a lower end of the cylindrical part 11a. An upper end of the cylindrical part 11a of the housing 11 is opened, and the bracket 14 is attached to such an opening. The bracket 14 includes an inner cylindrical part 14a formed around the central axis J1. A ball bearing 16 is provided in each of the inner cylindrical part 14a and the bottom part 11b of the housing 11. A shaft 17 is arranged coaxially with the central axis J1, and fixed respectively to the ball bearings 16, 16. Thus, the shaft 17 rotates around the central axis J1.

A resolver stator 22 of a resolver 20 as a position detecting mechanism is fixed axially below the ball bearing 16 in the inner cylindrical part 14a. A resolver rotor 21 is fixed to the shaft 17 with a radial space from an inner circumferential face of the resolver stator 22.

The stator 12 includes a core back part 12a fixed to an inner circumferential face of the cylindrical part 11a of the housing 11 and formed in an annular shape, and a plurality of teeth 12b extending from the core back part 12a toward the central axis J1 and arranged so as to be circumferentially spaced apart from one another. A plurality of coils 12c are formed by winding a plurality of conductive wires around the respective teeth 12b.

A bus bar 15 is arranged axially above the stator 12, the bus bar 15 having a plurality of power distribution plates 15a for electrically connecting wind start ends and wind finish ends of the plurality of coils 12c around the respective teeth 12b. In the bus bar 15, there is formed a power distribution plate retentive part 15b for retaining the plurality of power distribution plates 15a. A leg 15c is integrally formed with the power distribution plate retentive part 15b, the leg 15c connected to an outer circumferential face of the core back part 12a of the stator 12 for determining an axial position of the power distribution plate retentive part 15b with respective to the stator 12. The power distribution plate retentive part 15b is made of resin excellent in electrical isolation and formed integrally with the leg 15c. The power distribution plate retentive part 15b has a substantially circular arc shape in plan view seen from axially above. That is, the power distribution plate retentive part 15b includes a through-hole 15d formed around the central axis J1. The through-hole 15d forms an inner circumferential face of the power distribution plate retentive part 15b.

The inner cylindrical part 14a of the bracket 14 is inserted into the through-hole 15d of the power distribution plate retentive part 15b. The power distribution plate retentive part 15b and the resolver 20 are radially overlapped one another. Such a configuration can shorten an axial length of the brushless motor 10.

The rotor magnet 13 is indirectly retained by the shaft 17 via the rotor core 18. The rotor core 18 is formed with a plurality of thin steel plates as magnetic substances overlaid in the axial direction.

In such a configuration, the resolver 20 detects a rotational position of the rotor magnet 13. A control device (not shown) supplies electric current to the predetermined coil 12c wound around the respective teeth 12b in the stator 12 in accordance with the rotational position of the rotor magnet 13 so as to rotate the rotor magnet 13. Accordingly, the brushless motor 10 obtains rotational driving force around the central axis J1.

<Structure of Resolver>

Figure 2:
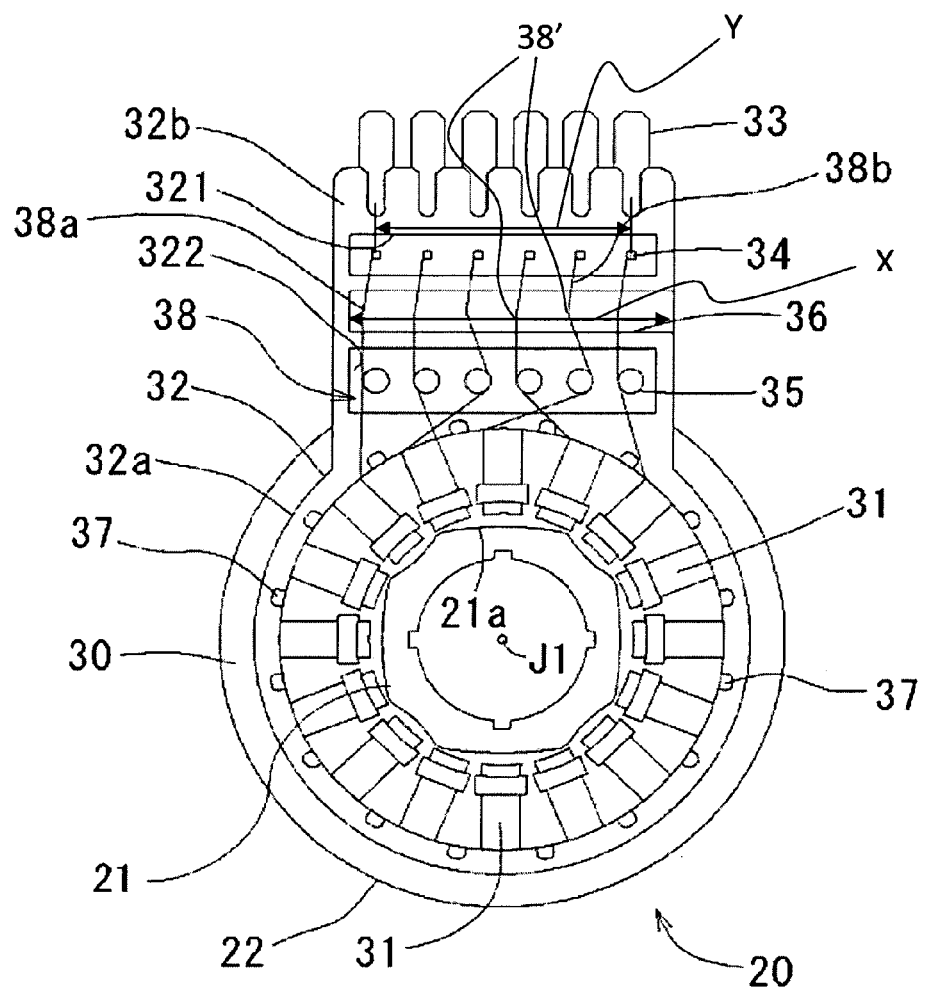
FIG. 2 is a plan view, seen from above, of a resolver stator according to a preferred embodiment of the present invention.
Figure 3:
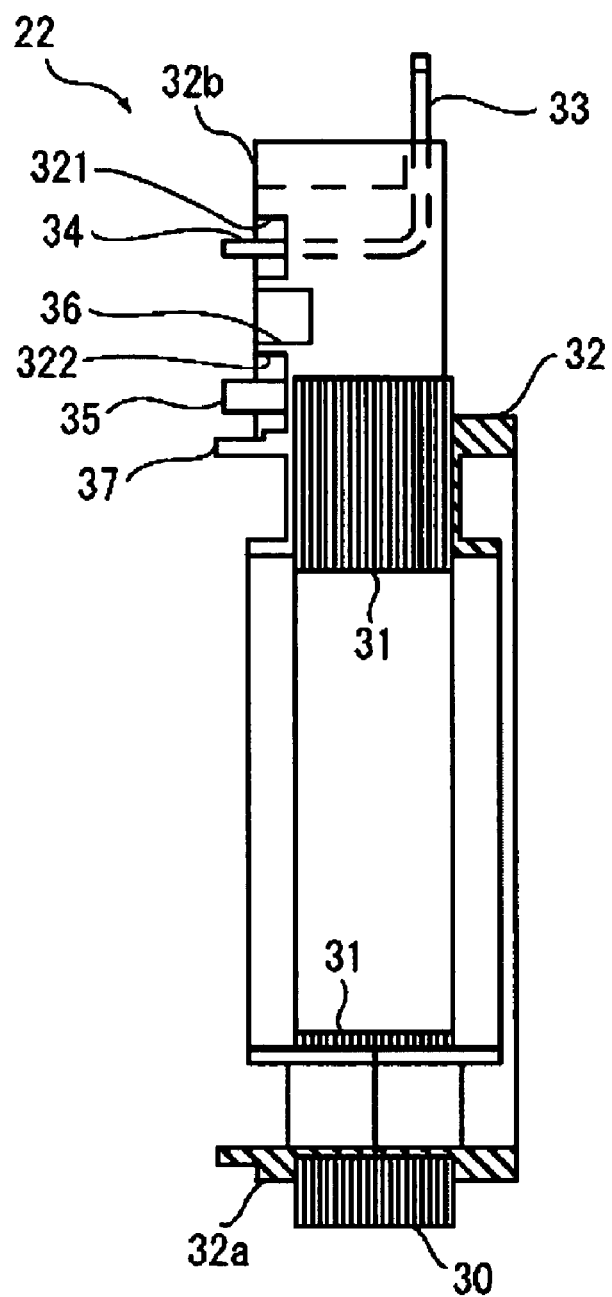
FIG. 3 is a schematic view, seen from side, of a resolver according to the first preferred embodiment of the present invention.

Hereinafter, a first preferred embodiment of the resolver 20 according to the present invention will be described with reference to FIGS. 2 and 3. FIG. 2 is a plan view, seen from above, of the resolver 20 according to the present invention. FIG. 3 is a schematic view (partially including a cross-sectional view), seen from side, of the resolver stator 22 according to the present invention.

The resolver stator 22 includes a core back part 30 formed in an annular shape, and a plurality of teeth 31 each extending from the core back part 30 toward the central axis J1 and circumferentially spaced apart from one another. The inner circumferential face of the resolver stator 22 is formed with inner circumferential faces of the plurality of teeth 31 circumferentially connected with one another into an annular shape.

The resolver rotor 21 has an outer circumferential face facing the inner circumferential face of the resolver stator 22 with a predetermined radial distance therebetween. An outer circumference of the resolver rotor 21 has four projections 21a formed on a circumference thereof. A radial distance between the projection 21a and the tooth 31 radially facing the projection 21a is smaller than a radial distance between the outer circumferential face other than the projections 21a and the tooth 31 radially facing the outer circumferential face. Thus, when the resolver rotor 21 rotates integrally with the shaft 17, the radial distance between the resolver rotor 21 and the teeth 31 varies.

Attached to the resolver stator 22 is an insulator 32 made of resin excellent in electrical isolation. The insulator 32 includes two members for sandwiching the resolver stator 22 respectively from axially (that is, direction along the central axis J1) above and below. The insulator 32 includes annular parts 32a for sandwiching the core back part 30 and the respective teeth 31 respectively from axially above and below, and a terminal block 32b extending radially outward from one end of the annular part 32a. The terminal block 32b is formed integrally with one of the two members of the insulator 32 on an axially upper side.

Into a radially outward end of the terminal block 32b, a plurality of terminal members 33 are implanted. With reference to FIG. 3, the terminal member 33 is a metal member bent in an L shape in side view. One end of the terminal member 33 projects radially outward from the terminal block 32b. To the one ends of the terminal members 33, lead wires (not shown) are respectively connected. The lead wires are connected to a control circuit (not shown). At the other end of the terminal member 33, there is provided a terminal pin 34 projecting axially upward from a top face of the terminal block 32b. A groove 321 for inpouring adhesive is formed on a base of the terminal pin 34. Ends of a first lead part 38a and a second lead part 38c (to be described later) connected to the terminal pins 34 are fixed with adhesive poured into the groove 321.

With reference to FIG. 2, six of the terminal pins 34 are linearly arranged substantially perpendicular to a direction of the terminal block 32b being extended. That is, six of the terminal members 33 are implanted in the terminal block 32b. On the top face of the terminal block 32b, six regulatory pins 35 are provided substantially in parallel with the six terminal pins 34 arranged. The regulatory pin 35 has a substantially cylindrical shape and is provided upward from the top face of the terminal block 32b along a substantially axial direction. A groove 322 for inpouring adhesive is formed also on a base of the regulatory pins 35. A conductive wire radially connecting the terminal pin 34 and the tooth 31 is fixed with adhesive poured into the groove 322.

Radially between the six terminal pins 34 and the six regulatory pins 35, there is formed a concave part 36 having a concave shape downward in the axial direction and extending substantially in parallel with the terminal pins 34 and the regulatory pins 35 arranged. With reference to FIG. 3, the concave part 36 is a groove in a substantially rectangular shape in cross section. The concave part 36 is linearly provided from one end (right end in FIG. 2) to the vicinity of the other end (left end in FIG. 2) of the terminal block 32b. A width of the concave part 36 in a direction thereof being arranged (that is, direction substantially perpendicular to the direction of the terminal block 32b being extended) is larger than a distance between the terminal pins 34 at both ends in a direction of the six terminal pins 34 being arranged, as well as a distance between the regulatory pins 35 at both ends in a direction of the six regulatory pins 35 being arranged. Into the concave part 36, a slackening member 43 (to be described later) is inserted. A bottom face of the concave part 36 is arranged axially below a top face of the core back part 30. Accordingly, an axial position of the slackening member 43 can be more freely set.

On the annular part 32a, a plurality of bridge pins 37 are arranged circumferentially spaced apart from one another at even intervals. The plurality of bridge pins 37 axially extend respectively from the annular part 32a. The plurality of bridge pins 37 are provided all over a circumference of an annular portion covering the core back part 30 in the annular part 32a.

As shown in FIG. 2, the resolver stator 22 having such a configuration has a plurality of winding wires 38 wound therearound with slack part 38'. The winding wire 38 includes the first lead part 38a of the conductive wire from the predetermined terminal pin 34 to the predetermined tooth 31 to be wound therearound, coil parts 38b formed by winding the conductive wire for a plurality of times respectively around the predetermined plurality of teeth 31, and the second lead part 38c of the conductive wire from the predetermined tooth 31 having wound therearound to the another terminal pin 34 on a position different from that of the initial terminal pin 34. That is, the winding wire 38 is formed of the conductive wire, one end thereof being soldered to the terminal pin 34 and an orbit thereof being regulated by the regulatory pin 35 to be wound around the predetermined tooth 31. The winding wire 38 wound around the tooth 31 is hung to the bridge pin 37 and then wound around the next predetermined tooth 31. After being wound around the predetermined plurality of teeth 31, the orbit of the winding wire 38 is again regulated by the regulatory pin 35 to be soldered to another terminal pin 34.

While the six terminal pins 34 are arranged, totally three of the winding wires 38 are mounted since each of the winding wires 38 leaves the predetermined terminal pin 34 and returns to be connected with the another terminal pin 34 (that is, totally the three conductive wires are mounted to the resolver stator 22). Each of the winding wires 38 is wound around the plurality of the teeth 31, as described above, to form the plurality of coils.

One of the three winding wires 38 is an excitation winding for supplying the coil with electric current, and the remaining two winding wires are output windings for obtaining output voltage from the coil. The resolver 20 is of a variable reluctance type. Input voltage as a sinusoidal signal is input to the excitation winding, and utilizing that the radial distance between the resolver rotor 21 and the coil varies in accordance with rotation of the resolver rotor 21, output voltage is obtained from the output winding. Thus, a rotational position of the resolver rotor 21, that is, the rotational position of the rotor magnet 13 is detected. In the present embodiment, however, the winding wire 38 is not specifically distinguished whether it is an excitation winding or an output winding. Therefore, the winding wire 38 is described with no such distinction made.

In the embodiment as illustrated in FIG. 2, a width X of the concave part in a direction substantially perpendicular to the direction of the terminal block being extended is larger than a distance Y between the terminal pins on both ends of the alignment of the terminal pins.

<Winding Machine>

Figure 4:
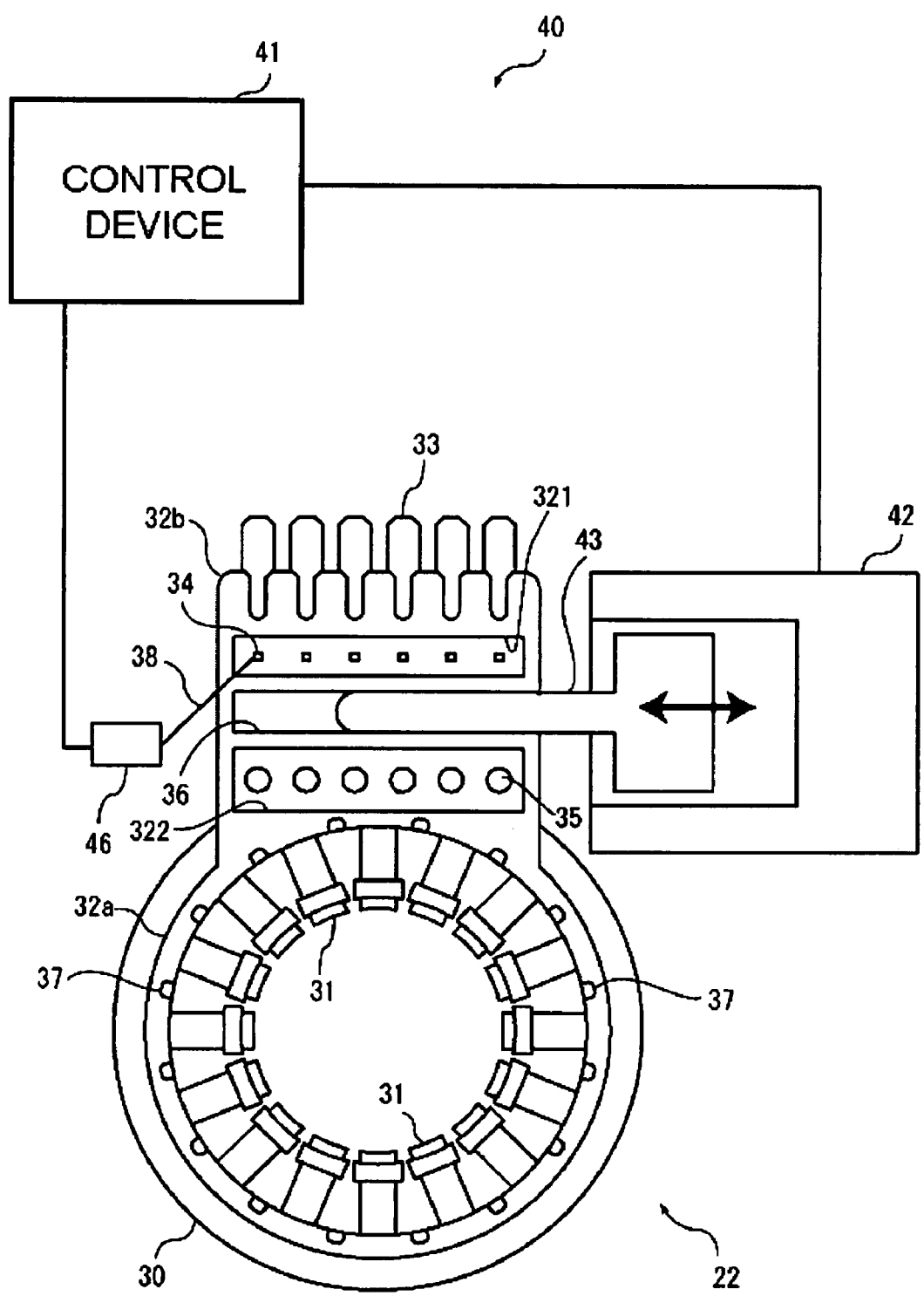
FIG. 4 is a schematic view of a winding machine and the resolver stator according to a first preferred embodiment of the present invention.
Figure 5:
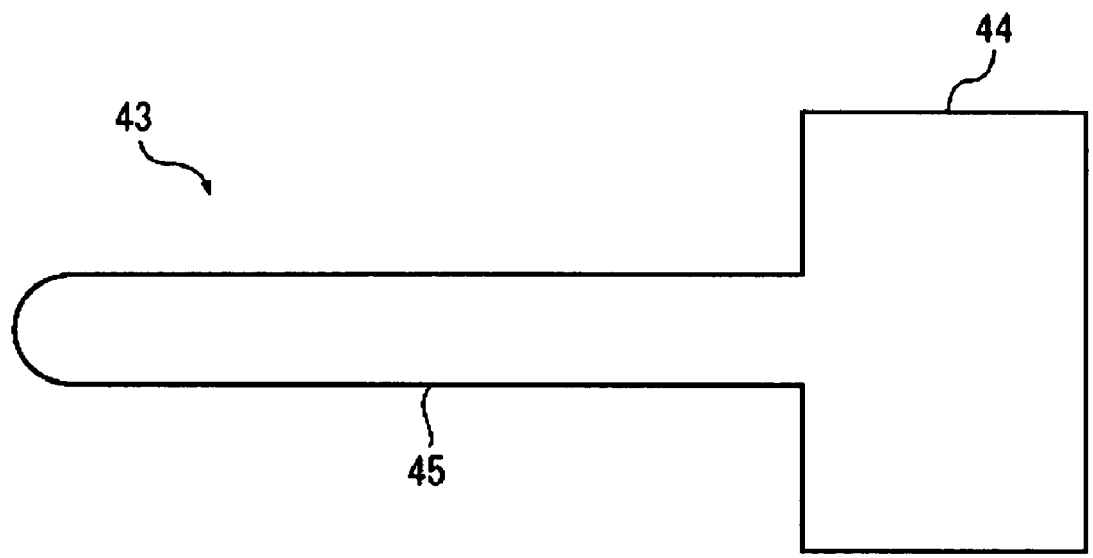
FIG. 5 is a plan view, seen from above, of a slackening member according to a first preferred embodiment the present invention.
Figure 6:
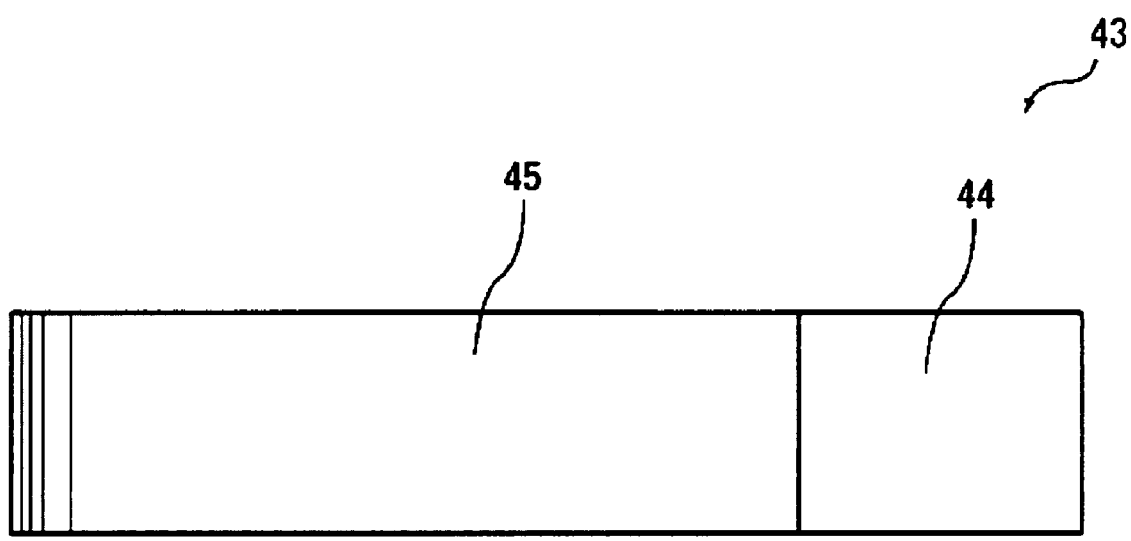
FIG. 6 is a schematic view, seen from side, of the slackening member according to the first preferred embodiment of the present invention.

With reference to FIGS. 4 to 6, there is described a configuration of a winding machine for mounting the winding wires 38 to the terminal pins 34 and the teeth 31 while the respective winding wire 38 has slack part 38' as described above. FIG. 4 is a schematic view showing that a winding machine 40 mounts the conductive wire forming the winding wire 38 to the resolver stator 22. FIG. 5 is a plan view of the slackening member 43 seen from above, and FIG. 6 is a plan view of the slackening member 43 seen from side. With reference to FIG. 4, the winding machine 40 includes a control device 41, an actuator 42 for sliding the slackening member 43, and a nozzle 46 for performing predetermined operations while holding the conductive wire forming the winding wire 38. The actuator 42 slides the slackening member 43 inserted into the concave part 36 within the concave part 36 under control of the control device 41. The nozzle 46 moves the conductive wire along a predetermined orbit, entwines the conductive wire around the terminal pin 34, and winds the conductive wire around the tooth 31 under control of the control device 41.

With reference to FIGS. 5 and 6, the slackening member 43 includes a base 44 having a substantially rectangular solid shape, and a slide member 45 having a substantially bar shape and projecting from an end of the base 44. A tip of the slide member 45 has a curved surface shape so as not to damage the conductive wire with the tip in bending the conductive wire forming the winding wire 38. Specifically, a height of the slide member 45 (equal to a height of the slackening member 43 in this embodiment) is made larger than a depth of the groove of the concave part 36. Accordingly, when being inserted into the concave part 36, the slide member 45 contacts the conductive wire forming the winding wire 38 in a portion projecting upward from the concave part 36.

Method for Forming Winding Wire

Figure 7:
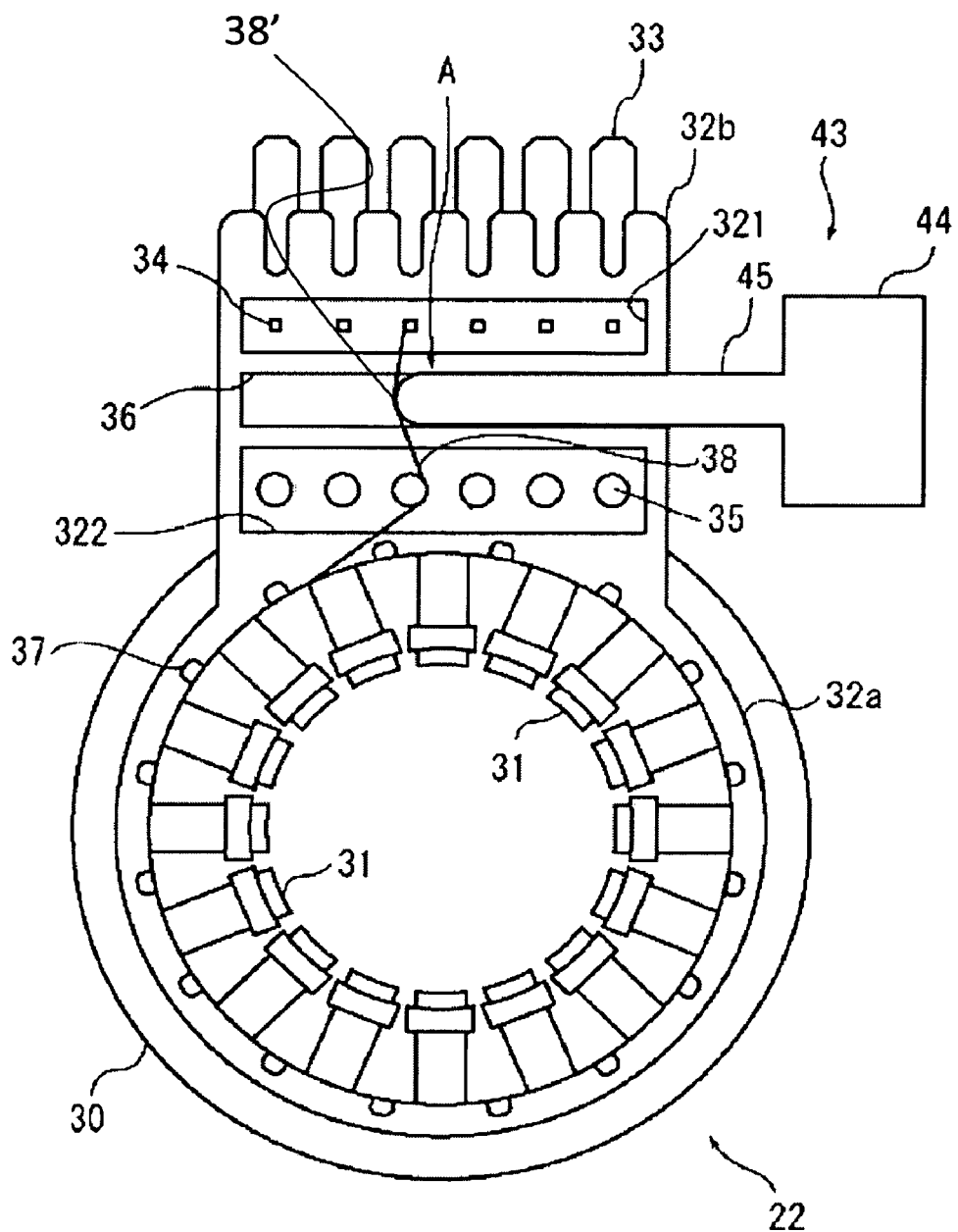
FIG. 7 is a schematic view showing an operating state of mounting a conductive wire with the slackening member according to the present invention.
Figure 8:
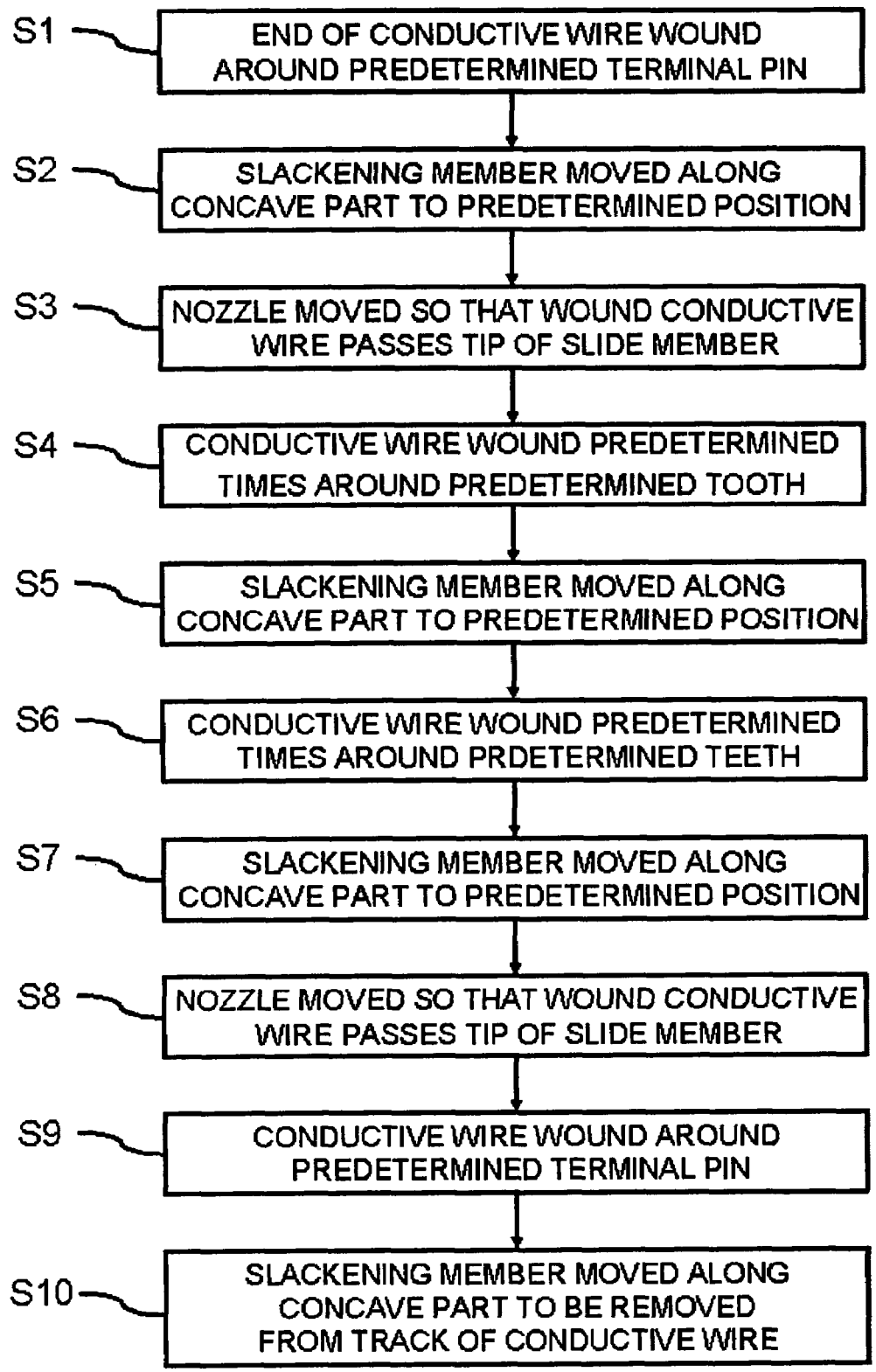
FIG. 8 is a flow chart illustrating a flow of steps of mounting the conductive wire with the slackening member according to the first preferred embodiment of the present invention.

With reference to FIGS. 4 to 8, a method for forming the winding wire 38 is described below. FIG. 7 is a schematic view showing a state where the slackening member 43 is inserted into the resolver 20. FIG. 8 is a flow chart showing process of forming the winding wire 38 in the resolver stator 22.

First, the nozzle 46 of the winding machine 40 entwines an end of the conductive wire to form the winding wire 38 around the predetermined terminal pin 34 (step S1 in FIG. 8). As preferred embodiment, there is described a case where the end of the conductive wire to form the winding wire 38 is entwined around the third terminal pin 34 from the left in FIG. 7.

Then, the actuator 42 moves the slackening member 43 along the concave part 36 so that the slackening member 43 is moved to a predetermined position (step S2). That is, the slackening member 43 is moved left in FIG. 7. In this preferred embodiment, as shown in FIG. 7, the slackening member 43 is moved so that the tip of the slide member 45 reaches a point A indicated with an arrow. The position of the slackening member 43 is fixed at this point.

The nozzle 46 is then moved so that the conductive wire entwined around the terminal pin 34 in step S1 passes the tip of the slide member 45 (step S3). That is, the conductive wire to form the winding wire 38 is extended from the terminal pin 34 toward the teeth 31, and as shown in FIG. 7, is bent due to contact with the tip of the slide member 45 to be further extended toward the teeth 31. During this operation, the conductive wire is not damaged since, as described above, the tip of the slide member 45 is processed into the curved surface. Specifically, a portion projecting upward from the concave part 36 on the curved surface of the tip of the slide member 45 bends the conductive wire. That is, the conductive wire can be made longer with respect to an orbit linearly connecting the terminal pin 34 and the tooth 31 (in other words, a locus linearly connecting the terminal pin 34 and the tooth 31), thereby providing slack part 38' to the conductive wire.

Next, the nozzle 46 is operated to guide the winding wire 38 so as to be hung to the predetermined regulatory pin 35 and wound around the predetermined tooth 31 for a few times (step S4). Thus, the conductive wire is temporarily fixed between the terminal pin 34 and the teeth 31, thereby forming the first lead part 38a of the winding wire 38.

The actuator 42 then moves the slackening member 43 along the concave part 36 so as to remove the slackening member 43 off an orbit of the first lead part 38a of the winding wire 38 (step S5). That is, the slackening member 43 is moved right in FIG. 7. Therefore, the winding wire 38 connects the terminal pin 34 and the tooth 31 with slack in a radial direction.

Then, the nozzle 46 is operated to wind the conductive wire for a predetermined times around the tooth 31 to which the conductive wire is temporarily fixed, and further, wind the conductive wire around the bridge pin 37 and the another predetermined tooth 31 (step S6). Accordingly, the coil parts 38b are formed respectively around the predetermined teeth 31.

Subsequently, the actuator 42 moves the slackening member 43 along the concave part 36 to a predetermined position (step S7). That is, the slackening member 43 is again moved left (left in FIG. 7). While the tip of the slide member 45 is moved to the point A on the orbit from the third terminal pin 34 from the left in FIG. 7 to the teeth 31 in step S2, the tip of the slide member 45 is moved, in step S7, on the orbit of the conductive wire from the tooth 31 around which the conductive wire is lastly wound in step S6 to the another terminal pin 34.

Then, the nozzle 46 is operated so that the conductive wire passes the tip of the slide member 45 (step S8). That is, the conductive wire is extended from the tooth 31 around which the conductive wire is lastly wound toward the terminal pin 34, is bent due to contact with the tip of the slide member 45, and is further extended to the terminal pin 34. The conductive wire is hung to the predetermined regulatory pin 35 before passing the tip of the slide member 45.

The nozzle 46 is then operated to entwine the conductive wire around the predetermined terminal pin 34 (step S9). Thus, the second lead part 38c is formed between the tooth 31 around which the conductive wire is lastly wound and the terminal pin 34.

Next, the actuator 42 moves the slackening member 43 along the concave part 36 so as to remove the slackening member 43 off an orbit of the second lead part 38c (step S10). That is, the slackening member 43 is again moved right (right in FIG. 7). Thereby, the second lead part 38c connects the terminal pin 34 and the tooth 31 with slack part 38'.

The winding machine 40 operates as described above to provide slack part 38' to the first lead part 38a of the winding wire 38 formed with the conductive wire from the terminal pin 34 to the tooth 31 around which the conductive wire is wounded. Similarly, slack part 38' is provided to the second lead part 38c from the tooth 31 to the terminal pin 34 around which the conductive wire is entwined. Accordingly, even when the insulator 32 (especially the terminal block 32b) made of resin is thermally expanded, it is possible to prevent the first lead part 38a and the second lead part 38c from being cut off due to a fact that the radial distance between the teeth 31 and the terminal pin 34 is enlarged by thermal expansion and the first lead part 38a and the second lead part 38c are tensioned. Further, as described above, adhesive is poured into the two grooves 321, 322 provided in the coil part 38b so as to fix the winding wire 38 mounted in accordance with the steps described above. Therefore, the first lead part 38a and the second lead part 38c of the winding wire 38 can be prevented from swinging to be cut off due to vibration of the brushless motor or external impact.

In the present embodiment, as described above, the slackening member 43 moves along the concave part 36. A direction of such movement is identical to a substantially horizontal direction substantially orthogonal to the direction of the terminal block 32b being extended (hereinafter, simply referred to as horizontal direction).

Specifically, in the present embodiment, the slackening member 43 moves in the horizontal direction to bend the first lead part 38a and the second lead part 38c in the horizontal direction. The winding machine 40 mounts between the terminal pin 34 and the teeth 31 the conductive wire forming the first lead part 38a and the second lead part 38c while the slackening member 43 is inserted into the concave part 36 so as to bend the first lead part 38a and the second lead part 38c. Accordingly, when the slackening member 43 is moved so as to be removed off the orbits of the first lead part 38a and the second lead part 38c, the tip of the slide member 45 immediately moves away from the first lead part 38a and the second lead part 38c without damaging the conductive wire. In other words, since the slackening member 43 is not in contact with the conductive wire when moving out of the orbits of the first lead part 38a and the second lead part 38c, the conductive wire is not damaged.

Further, since the slackening member 43 moves in the concave part 36, only a part of the surface of the terminal block 32b is required to be processed, as shown in FIG. 3. No necessity of providing a large opening or the like to the terminal block 32b results in preventing deterioration in intensity of the terminal block 32b.

The slackening member 43 bends the orbits of the first lead part 38a and the second lead part 38c in the horizontal direction. Although there has been a problem that the conductive wire is difficult to be wound around the tooth 31 in a case where the first lead part 38a and the second lead part 38c are bent while being pushed upward (that is, upward direction along the central axis J1), the first lead part 38a and the second lead part 38c of the winding wire 38 according to the present invention are bent only in the horizontal direction so as not to affect winding operation.

In the above embodiment, the first lead part 38a and the second lead part 38c of the conductive wire mounted between the terminal pin 34 and the teeth 31 are hung to the regulatory pin 35. Accordingly, as shown in FIG. 2, a cross point of the first lead parts 38a and that of the second lead parts 38c are located near the teeth 31. FIG. 2 shows that the first lead parts 38a or the second lead parts 38c connected to the second and third terminal pins 34 from the left cross with each other between the regulatory pins 35 and the teeth 31. Also, it shows that the first lead parts 38a or the second lead parts 38c connected to the second and third terminal pins 34 from the right cross with each other between the regulatory pins 35 and the teeth 31.

Thus, the cross point of the first lead parts 38a or the second lead parts 38c are located not on a side of the terminal pins 34 but on a side the teeth 31 with respect to the regulatory pins 35 so as to prevent the nozzle 46 of the winding machine 40 from contacting the cross point. If the cross point is located between the terminal pins 34 and the regulatory pins 35, the nozzle 46 repeatedly moves around on the cross point during entwining the conductive wire around the terminal pins 34, and the nozzle 46 possibly contacts the first lead part 38a or the second lead part 38c. On the contrary, if the cross point is located radially between the regulatory pin 35 and the teeth 31, the nozzle 46 passes on the cross point only once, minimizing a possibility that the nozzle 46 contacts the conductive wire.

Apart from the above reason, the first lead part 38*a* and the second lead part 38*c* are hung to the regulatory pins 35 so as to determine the orbits of the first lead part 38*a* and the second lead part 38*c*.

Second Preferred Embodiment of Resolver

Figure 9:
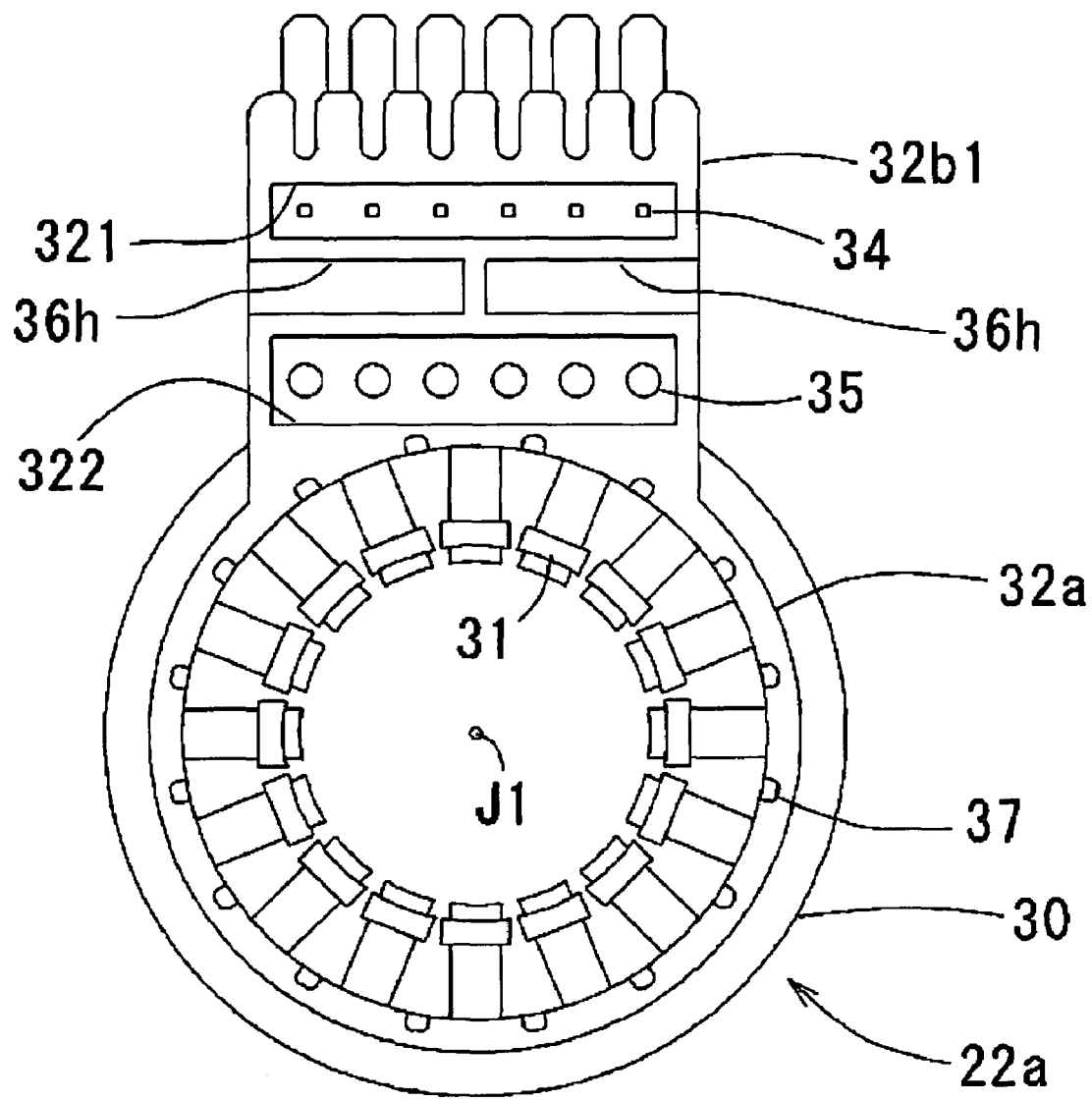
FIG. 9 is a plan view, seen from above, of a resolver stator according to a second preferred embodiment of the present invention.
Figure 10:
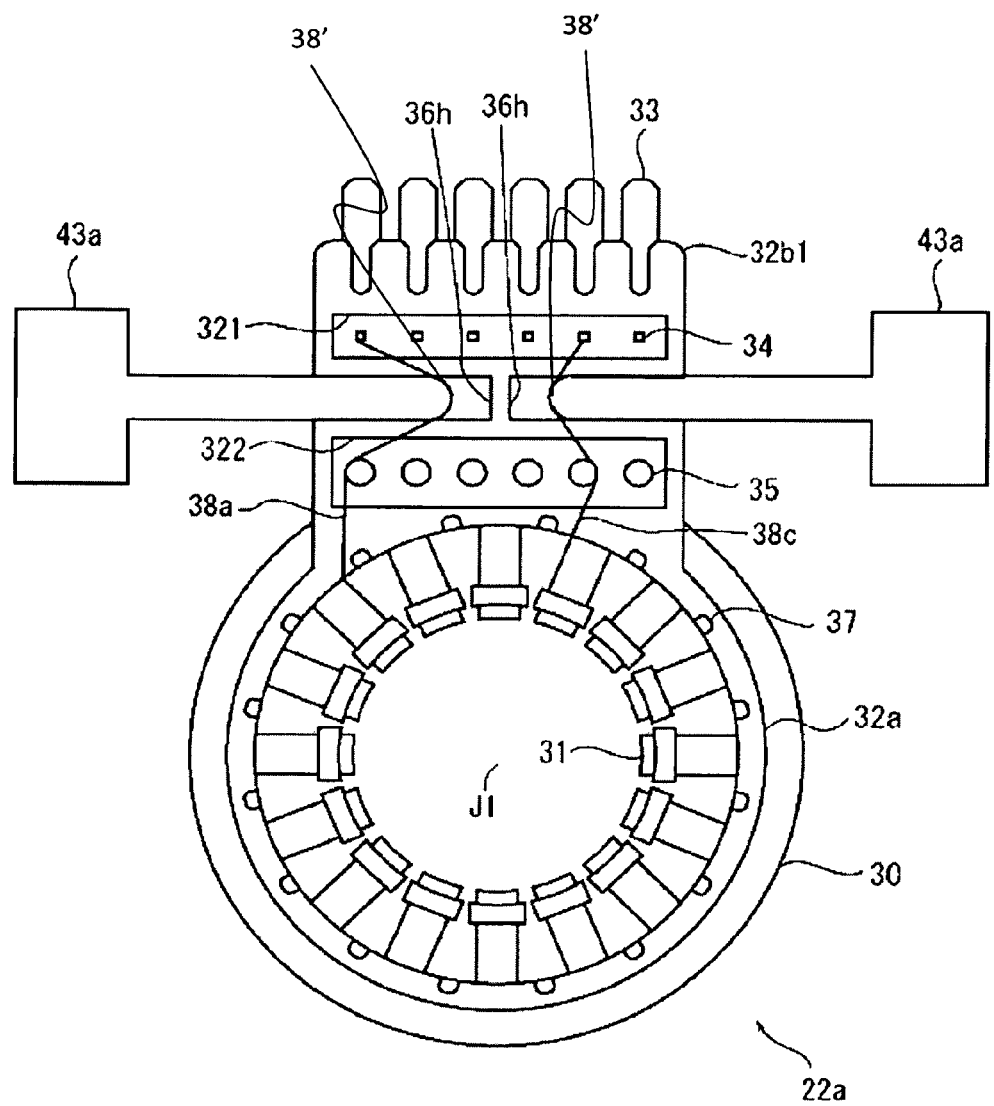
FIG. 10 is a schematic view of mounting the conductive wire with a slackening member according to the present invention being held.

A second preferred embodiment of the resolver according to the present invention is described with reference to FIGS. 9 and 10. FIG. 9 is a plan view, seen from above, of the second preferred embodiment of a resolver stator 22*a*. In FIG. 9, configurations similar to those of the first preferred embodiment of the resolver 20 are designated by identical reference signs. FIG. 10 is a schematic view showing another mode of the operating state of mounting the conductive wire with the slackening member according to the present invention being held.

With reference to FIG. 9, two concave parts 36*h*, 36*h* are provided on a top face of a terminal block 32*b*1 of the resolver stator 22*a*. Each of the concave parts 36*h*, 36*h* is formed from a horizontal end of the terminal block 32*b*1 to the vicinity of a center of the terminal block 32*b*1. The concave part 36*h* has a cross-sectional shape similar to that of the concave part 36 shown in FIG. 3. As shown in FIG. 10, two slackening members 43*a*, 43*a* are inserted respectively into the two concave parts 36*h*, 36*h* from horizontal both sides. A configuration of the slackening member 43*a* is similar to that of the slackening member 43 shown in FIGS. 5 and 6, while the length of the slide member 45 may be shorter than that shown in FIG. 5 and the like.

According to the second preferred embodiment, the slackening members 43*a* can be simultaneously located at two points. For example, the first lead part 38*a* from the terminal pin 34 to the teeth 31 and the second lead part 38*c* from the teeth 31 to the terminal pin 34 can be simultaneously provided with slack part 38'.

Also in the second preferred embodiment, the slackening member 43*a* moves in the horizontal direction to bend the first lead part 38*a* and the second lead part 38*c*. When the slackening member 43*a* moves away from the first lead part 38*a* and the second lead part 38*c*, a tip of the slackening member 43*a* immediately moves away from the first lead part 38*a* and the second lead part 38*c* so as not to damage the conductive wire. Further, there is no need to provide the terminal block 32*b*1 with a large opening or the like, thereby preventing deterioration in intensity of the terminal block 32*b*1. In addition, the conductive wire is bent in the horizontal direction by the slackening member 43*a* to prevent affecting winding operation around the tooth 31.

Another Structure of Slackening Member

Figure 11:
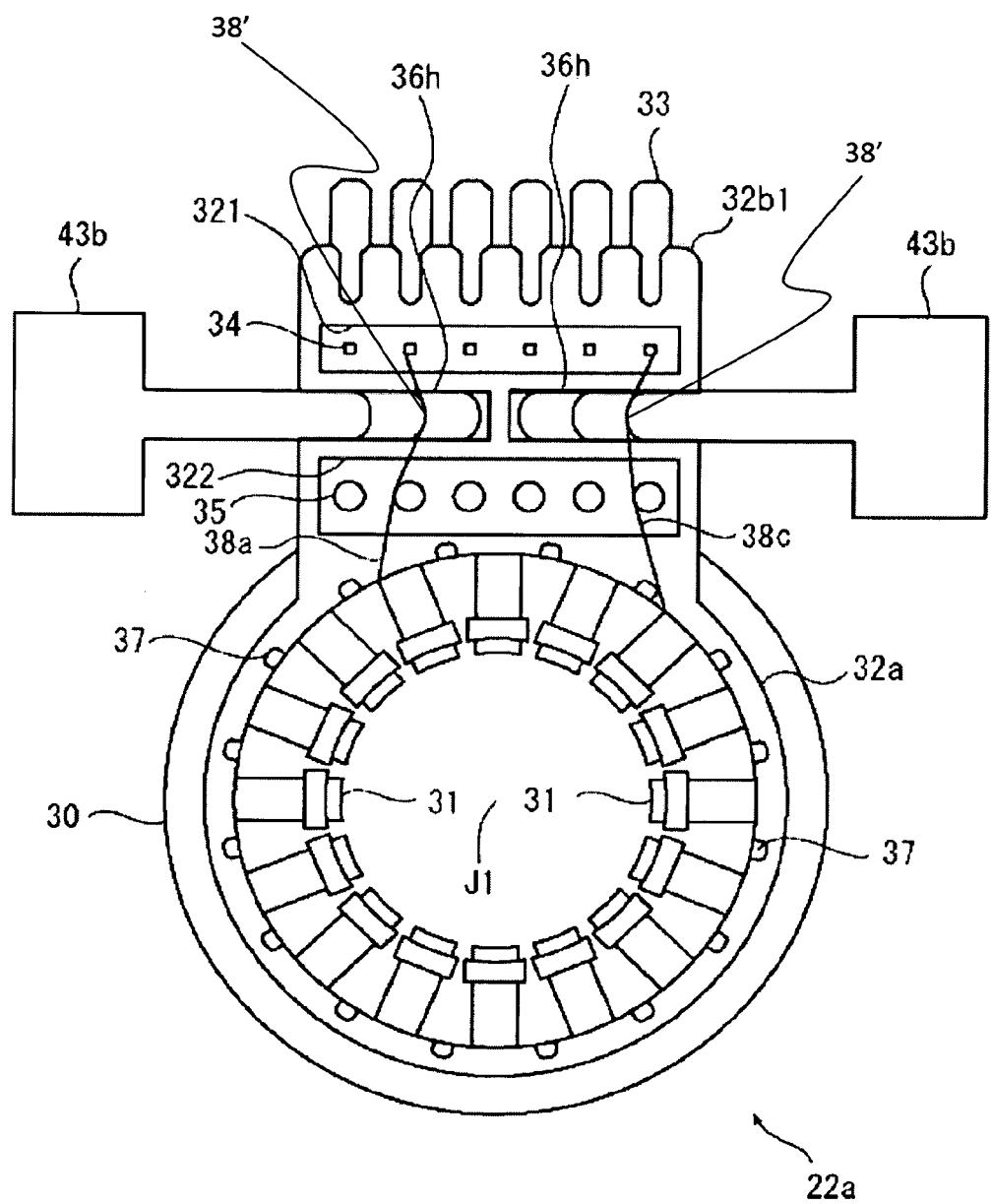
FIG. 11 is a schematic view showing the operating state of mounting the conductive wire with another mode of the slackening member according the present invention being held.
Figure 12:
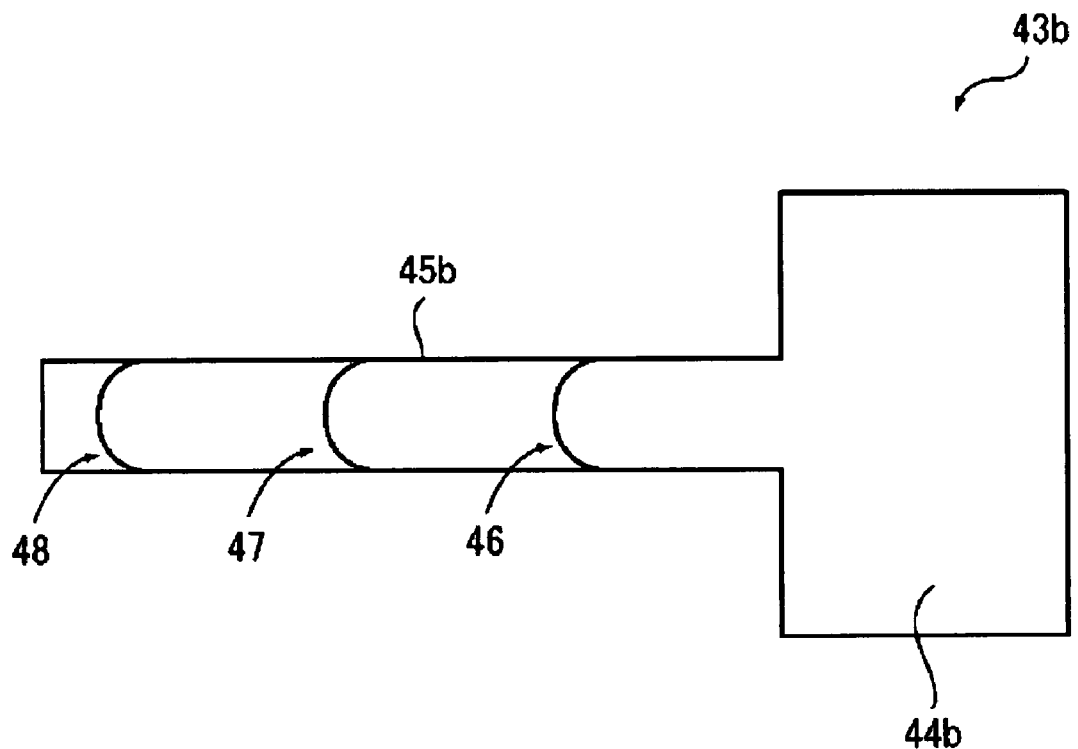
FIG. 12 is a plan view, seen from above, of the another mode of the slackening member according to the present invention.
Figure 13:
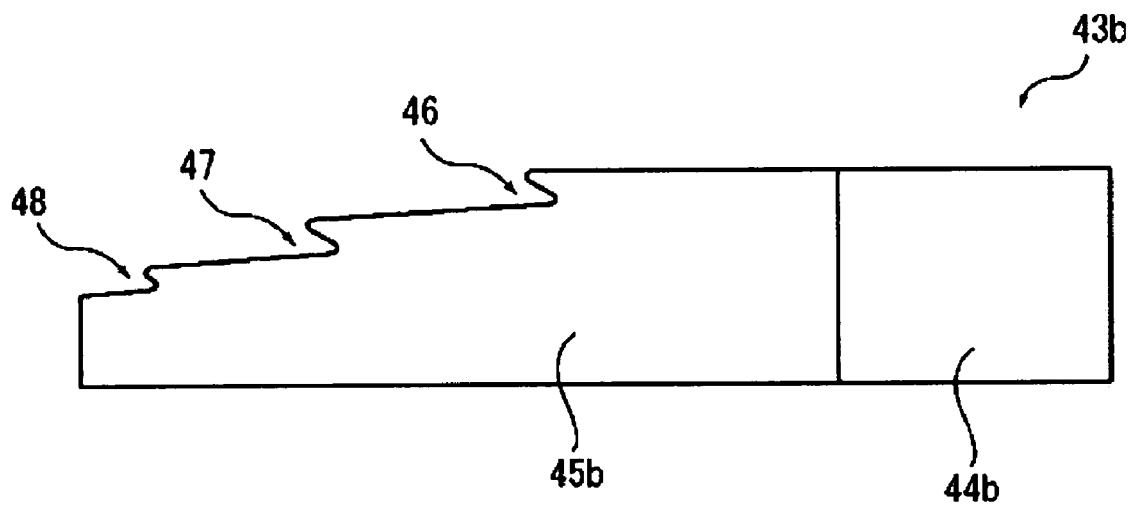
FIG. 13 is a plan view, seen from side, of the another mode of the slackening member according to the present invention.

Another structure of a slackening member 43*b* is now described with reference to FIGS. 11 to 13. FIG. 11 is a schematic view showing the operating state of mounting the conductive wire with another mode of the slackening member according to the present invention being held. FIG. 12 is a plan view, seen from above, of the another mode of the slackening member according to the present invention. FIG. 13 is a plan view, seen from side, of the another mode of the slackening member according to the present invention.

FIG. 11 shows a configuration similar to that of the resolver stator 22*a* shown in FIG. 9. Specifically, the two concave parts 36*h*, 36 *h* are formed on the terminal block 32*b*1.

With reference to FIGS. 12 and 13, as in the slackening members 43, 43*a*, the slackening member 43*b* has a slide member 45*b* projecting from a base 44*b* having a substantially rectangular solid shape. However, difference from the slackening members 43, 43*a* is found in that a top face of the slide member 45*b* is provided with three locking grooves 47, 48, 49 forming stairs. The top face extending from the locking grooves 47, 48, 49 toward a tip includes an inclined face declining toward the tip.

As shown in FIG. 11, the slackening members 43*b*, 43*b* having such a configuration are inserted respectively from both horizontal sides of the terminal block 32*b*1 along the concave parts 36*h*, 36*h*, so that the orbits of the first lead parts 38*a* and the second lead parts 38*c* are bent simultaneously at six points. FIG. 11 shows bending the orbits of the conductive wire connecting the second terminal pin 34 from the left and the teeth 31 (the first lead part 38*a* or the second lead part 38*c*) and the conductive wire connecting the first terminal pin 34 from the right and the teeth 31 (the first lead part 38*a* or the second led part 38*c*). Actually, it is possible to simultaneously bend the orbits of the first led parts 38*a* and the second led parts 38*c* connected to all of the six terminal pins 34. Unlike the slackening members 43. 43*a* of the above embodiment, it is not required to slide the slackening members 43*b*, 43*b* every time the nozzle of the winding machine steps over. That is, all the winding wires can be wound while the slackening members 43*b*, 43*b* are attached to the resolver as shown in FIG. 11.

In this preferred embodiment, the slackening members 43*b*, 43*b* are respectively inserted from the both horizontal sides of the terminal block 32*b*1, while a single slackening member having six locking grooves in a stair shape can be inserted into the concave part 36 of the resolver 20 shown in FIG. 2.

The one mode of the preferred embodiment of the present invention has been described, while the present invention can be variously modified within the scope of the following claims.

What is claimed is:

1. A resolver comprising:
   a rotor core having an outer circumferential face in a non-circular shape, for rotating around a predetermined central axis;
   a plurality of teeth having an axis core identical to that of the central axis and extending toward the central axis to be arranged circumferentially spaced apart from one another;
   a coil formed by winding a conductive wire for a plurality of times around each of the plurality of teeth;
   a terminal block extending radially outward from the plurality of teeth and having a plurality of terminal pins respectively connected with a lead part of the coil; and
   a concave part formed radially inside the plurality of terminal pins on the terminal block, the concave part extending in a substantially horizontal direction substantially orthogonal to a direction of the terminal block being extended, the lead part of the coil being across the concave part,
   wherein the lead part between the teeth and the terminal pin includes a slack part.

2. The resolver according to claim 1, wherein
   a plurality of regulatory pins for hanging thereon the respective lead part are formed radially between the concave part and the teeth on the terminal block, the regulatory pins axially extending from a top face of the terminal block.

3. The resolver according to claim 2, wherein
   the plurality of terminal pins are aligned in a line substantially perpendicular to the direction of the terminal block being extended, and the plurality of regulatory pins are aligned substantially in parallel with the plurality of terminal pins.

4. The resolver according to claim 2, wherein
the plurality of terminal pins and the plurality of regulatory pins are identical in number.

5. The resolver according to claim 1, wherein
a plurality of regulatory pins for hanging thereon the respective lead part are formed radially between the concave part and the teeth on the terminal block, the regulatory pins axially extending from a top face of the terminal block, and
the slack part is formed radially between the regulatory pin and the terminal pin.

6. The resolver according to claim 1, wherein
a slackening member is inserted into the concave part, the slackening member for sliding along the concave part and contacting the lead part to form the slack part.

7. A resolver comprising:
a rotor core having an outer circumferential face in a non-circular shape, for rotating around a predetermined central axis;
a plurality of teeth having an axis core identical to that of the central axis and extending toward the central axis to be arranged circumferentially spaced apart from one another;
a coil formed by winding a conductive wire for a plurality of times around each of the plurality of teeth;
a terminal block extending radially outward from the plurality of teeth and having a plurality of terminal pins respectively connected with a lead part of the coil; and
a concave part formed radially inside the plurality of terminal pins aligned on the terminal block, the concave part extending in a substantially horizontal direction substantially orthogonal to a direction of the terminal block being extended,
wherein a width of the concave part in a direction substantially perpendicular to the direction of the terminal block being extended is larger than a distance between the terminal pins on both ends of the alignment of the terminal pins.

8. A motor mounting a resolver,
the resolver comprising:
a rotor core having an outer circumferential face in a noncircular shape, for rotating around a predetermined central axis;
a plurality of teeth having an axis core identical to that of the central axis and extending toward the central axis to be arranged circumferentially spaced apart from one another;
a coil formed by winding a conductive wire for a plurality of times around each of the plurality of teeth;
a terminal block extending radially outward from the plurality of teeth and having
a plurality of terminal pins respectively connected with a lead part of the coil; and
a concave part formed radially inside the plurality of terminal pins on the terminal block, the concave part extending in a substantially horizontal direction substantially orthogonal to a direction of the terminal block being extended, wherein the lead part radially between the teeth and the terminal pin includes a slack part, and
the motor comprising:
a shaft arranged coaxially with the central axis;
a rotor magnet for rotating integrally with the shaft;
a stator having an axis core identical to that of the central axis and radially facing the rotor magnet;
a housing having a cylindrical part for fixing the stator and a bottom part for blocking an end of the cylindrical part; and
a bracket for blocking another end of the cylindrical part, wherein
the rotor core is fixed to the shaft, and
the teeth are indirectly fixed to the bracket.

9. The motor according to claim 8, further comprising:
at one end of the stator, a bus bar including a plurality of power distribution plates to be electrically connected with the stator and a power distribution plate retentive part having a through-hole along the central axis, for retaining the plurality of power distribution plates, wherein
the resolver is arranged in the through-hole of the bus bar, and
the power distribution plate retentive part and the resolver are radially overlaid with each other.

10. The motor according to claim 9, wherein
the power distribution plate retentive part has a substantially circular arc shape,
the terminal block is arranged at a cutout part not formed with the power distribution plate retentive part, and
the terminal block projects radially outward from an inner circumferential face of the through-hole.

* * * * *